US010093450B2

(12) United States Patent
Embleton et al.

(10) Patent No.: US 10,093,450 B2
(45) Date of Patent: Oct. 9, 2018

(54) TRANSPORTATION PALLET AND METHOD FOR DEPALLETIZING LOAD

(71) Applicant: DELL PRODUCTS, L.P., Round Rock, TX (US)

(72) Inventors: Steven Embleton, Austin, TX (US); Rene J. Salas, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 15/345,388

(22) Filed: Nov. 7, 2016

(65) Prior Publication Data
US 2018/0127147 A1 May 10, 2018

(51) Int. Cl.
B65D 19/42 (2006.01)
B65D 19/00 (2006.01)
B65D 85/00 (2006.01)
F16F 15/02 (2006.01)
F16F 15/027 (2006.01)

(52) U.S. Cl.
CPC ......... B65D 19/42 (2013.01); B65D 19/0077 (2013.01); B65D 85/00 (2013.01); F16F 15/022 (2013.01); F16F 15/027 (2013.01); B65D 2519/0086 (2013.01); B65D 2519/00781 (2013.01); B65D 2519/00805 (2013.01)

(58) Field of Classification Search
CPC ............... B65D 19/0077; B65D 85/00; B65D 2519/00781; B65D 2519/00805; B65D 2519/0086; F16F 15/022; F16F 15/027
See application file for complete search history.

(56) References Cited

U.S. PATENT DOCUMENTS

| 3,351,027 | A | * | 11/1967 | Ellard, Jr. | .......... B65D 19/0028 108/57.12 |
| 3,366,231 | A | | 1/1968 | Trakas | |
| 3,440,976 | A | * | 4/1969 | Burne | .......... B65D 19/00 108/51.11 |
| 3,554,135 | A | | 1/1971 | Duvall et al. | |
| 3,719,299 | A | * | 3/1973 | Oehler | .......... B60P 1/6427 254/93 HP |
| 3,822,761 | A | * | 7/1974 | Vaughen | .......... 180/121 |

(Continued)

FOREIGN PATENT DOCUMENTS

| JP | 63214533 A | * | 9/1988 |
| JP | 05254494 A | * | 10/1993 |
| JP | 06144439 A | * | 5/1994 |

Primary Examiner — Hanh V Tran
(74) Attorney, Agent, or Firm — Isidore PLLC

(57) ABSTRACT

A height-adjustable shock pallet includes a lower deck and an upper deck. A central portion of the upper deck is sized to receive a rack-mounted information handling system (IHS) for shipping. Air bags attached between the lower and upper decks are selectively inflatable to protect the rack-mounted IHS during transport and deflatable to position the upper deck proximate to the lower deck for unloading. A controller can detect a tilt of the upper deck and differentially inflate or deflate respective subsets of the air bags to rebalance the upper deck. The controller maintains the rack-mounted IHS horizontal to prevent tipping during transport. Integral or attachable caster wheels can enable repositioning of the height-adjustable shock pallet with the air bags deflated.

20 Claims, 15 Drawing Sheets

(56) References Cited

U.S. PATENT DOCUMENTS

| | | | |
|---|---|---|---|
| 4,235,940 A * | 11/1980 | Williams | C12G 1/062 209/325 |
| 4,347,794 A * | 9/1982 | Nordstrom | B65D 19/38 108/57.15 |
| 4,553,887 A | 11/1985 | Reeves | |
| 4,841,848 A * | 6/1989 | Baker | C12G 1/062 366/128 |
| 5,483,709 A * | 1/1996 | Foster | A61G 7/05769 180/125 |
| 5,819,943 A | 10/1998 | Depuy | |
| 5,911,179 A | 6/1999 | Spiczka | |
| 6,035,790 A * | 3/2000 | Polando | B65D 19/44 108/55.1 |
| 6,073,291 A | 6/2000 | Davis | |
| 6,105,511 A | 8/2000 | Bridges | |
| 6,513,974 B2 | 2/2003 | Malone et al. | |
| 6,915,903 B2 | 7/2005 | Manuel et al. | |
| 6,923,298 B2 * | 8/2005 | Tanner | B60G 13/14 188/136 |
| 7,322,480 B2 | 1/2008 | Bragadeste et al. | |
| 2007/0210542 A1 * | 9/2007 | Hammond | B62B 3/008 280/43.12 |
| 2010/0179730 A1 * | 7/2010 | Hiemenz | B60N 2/4242 701/45 |
| 2010/0212982 A1 * | 8/2010 | Lin | B60V 3/025 180/124 |
| 2010/0287703 A1 * | 11/2010 | Zapata | A61B 6/0457 5/601 |
| 2010/0294175 A1 * | 11/2010 | Cummins | F16F 9/54 108/57.12 |
| 2011/0284711 A1 * | 11/2011 | Hsiao | B65D 19/38 248/346.03 |
| 2012/0025027 A1 * | 2/2012 | Yandle | B64D 1/14 244/137.1 |
| 2012/0048169 A1 * | 3/2012 | Linares | B63B 7/082 114/266 |
| 2013/0037538 A1 | 2/2013 | Dahlquist | |
| 2016/0107793 A1 * | 4/2016 | Jiang | B65D 19/0073 206/599 |
| 2016/0221716 A1 * | 8/2016 | Embleton | B65D 19/38 |

\* cited by examiner

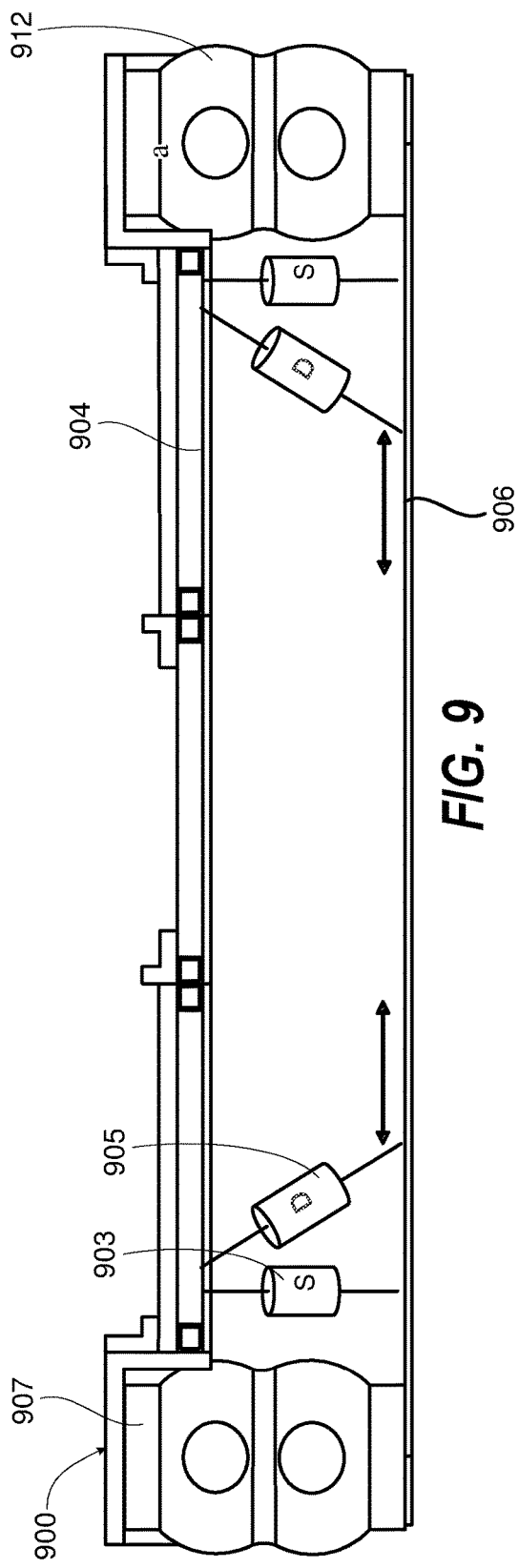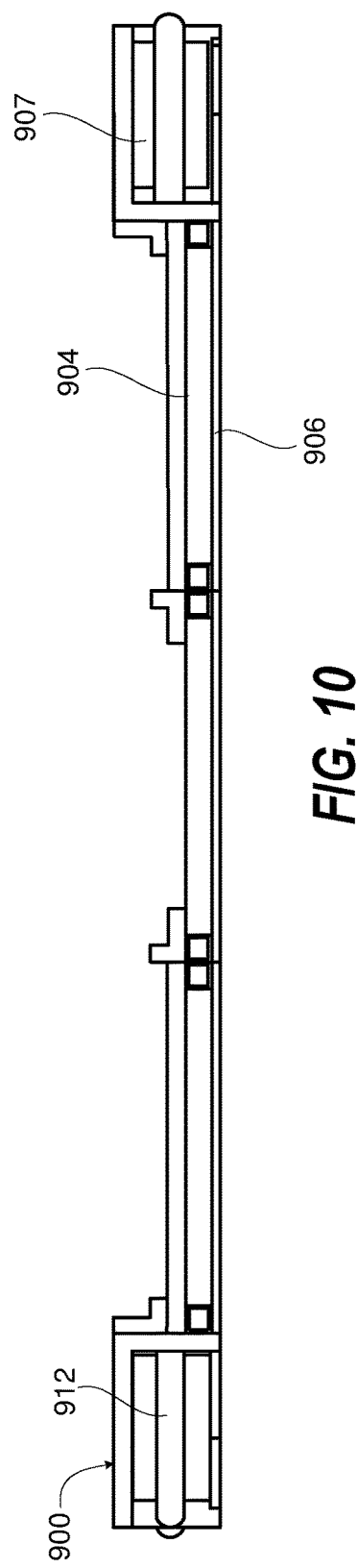

TRANSPORTATION PALLET AND METHOD FOR DEPALLETIZING LOAD

BACKGROUND

1. Technical Field

This disclosure generally relates to shipping of information handling systems (IHSs), and more particular to pallets used to support IHSs during shipping.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An Original Equipment Manufacturer (OEM) of rack-mounted IHSs can ship hundreds of fully integrated racks in a year. Each rack-mounted IHS can range in weight from as little as 700 lbs. to over 4500 lbs., and can contain up to $1 M of Information Technology (IT) hardware. These fully integrated racks are required to survive the worldwide transportation environment, which can involve transportation by truck, plane, boat, and/or other transportation medium. A shock pallet is the primary protection for the IT hardware in the rack. In order to provide a sufficient thickness of resilient material to absorb vibrations during transport, the shock pallet has to be approximately 7 or 8 inch height.

Unloading of rack-mounted IHSs from the shock pallet is one of the more hazardous undertakings during the transportation cycles. First, these very heavy rack-mounted IHSs need to be rocked to move them from the divot worked into a pallet top of the shock pallet. Then at least four large men are required to maneuver the rack in a controlled descent down a 14 foot ramp. At the bottom of the ramp, the handlers need to reduce the momentum and bring the rack to a halt safely and quickly without allowing the rack-mounted IHS to tip over.

The unloading of rack-mounted IHSs is also a problem for logistics. The 14 foot ramp is 250 lbs. and must be transported along with the palletized rack-mounted IHSs or stored at the customer site. The number of deployed 14 foot ramps can be sizeable when including many major integration hubs worldwide. If transported with the palletized rack-mounted IHSs, the ramp also needs to be returned at the end of the engagement. This ramp alone takes two to three people to carry and maneuver into place.

Another limitation is that generally known shock pallets rely upon resilient or compressible materials to provide a degree of damping. Wood and foam blocks used for such purposes tend to degrade with use. Often, shock pallets are only used about six times before the entire shock pallet has to be discarded and replaced.

BRIEF SUMMARY

The illustrative embodiments of the present disclosure provide a height-adjustable shock pallet that includes a lower deck. The height-adjustable shock pallet includes an upper deck having a central portion sized to receive a rack-mounted information handling system (IHS) for shipping. The upper deck is selectively positionable: (i) in a lowered position that is proximate to the lower deck and supporting surface for loading and unloading, and (ii) in a raised position, spaced apart from the lower deck. The height-adjustable shock pallet includes a plurality of air bags attached between the lower and upper decks. The air bags are selectively inflatable to protect the rack-mounted IHS during transport and deflatable to position the upper deck between the raised position and the lowered position.

According to at least one aspect of the present disclosure, a height adjusting shock pallet expedites shipping and depalletizing of rack-mounted IHS. The IHS includes a device interface in communication with an electrically actuated source of compressed gas. The electrically actuated source is used to selectively pressurize a first pneumatic interconnect to a first subset of air bags and a second pneumatic interconnect to a second subset of air bags that is exclusive of the first subset to raise an upper deck of a shock pallet that has received a rack-mounted IHS away from a lower deck. The IHS includes a tilt sensor attached to an upper deck of the shock pallet. IHS also includes a controller that is in communication with the tilt sensor and the electrically actuated source via the device interface. The controller: (i) simultaneously pressurizes a first pneumatic interconnect to the first subset of air bags and a second pneumatic interconnect to the second subset of air bags to raise the upper deck of a shock pallet that has received a rack-mounted IHS away from the lower deck; (ii) detects a tilt of/in the upper deck; and (iii) differentially adjusts pressure between the first and second subsets of the plurality of air bags via the first and second pneumatic interconnects respectively to mitigate the tilt of the upper deck.

According to at least one aspect of the present disclosure, a method is provided of adjusting a height-adjustable shock pallet utilized to expedite shipping and depalletizing of rack-mounted information handling systems (IHSs). In one or more embodiments, the method includes simultaneously pressurizing a first pneumatic interconnect to a first subset of air bags and a second pneumatic interconnect to a second subset of the air bags, exclusive of the first subset to raise an upper deck of a shock pallet away from a lower deck. The method includes detecting a tilt of the upper deck. The method includes adjusting differential pressure between the first and second pneumatic interconnects to mitigate the tilt of the upper deck.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 9 illustrates a side view of an example height-adjustable shock pallet in a raised position incorporating passive spring and dampening components to augment an air suspension system of air bags, according to one or more embodiments;

FIG. 10 illustrates a side view of the example height-adjustable shock pallet in a lowered position, according to one or more embodiments;

DETAILED DESCRIPTION

Figure 1:
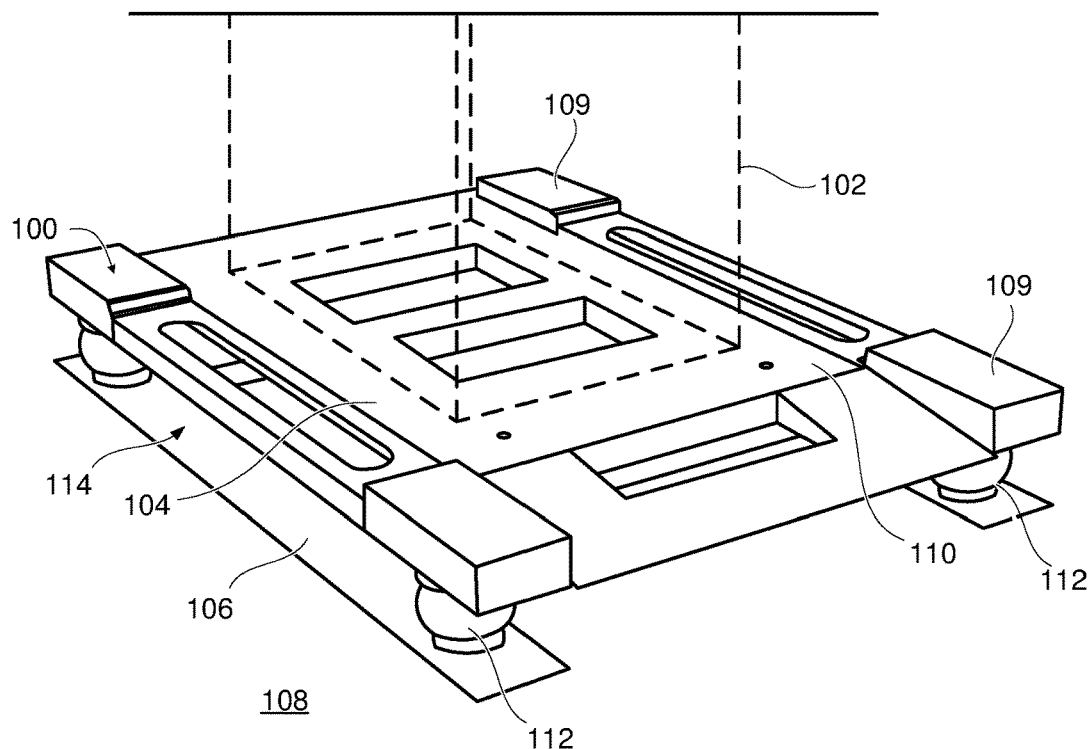
FIG. 1 illustrates a perspective view of an example height-adjustable shock pallet with integral ramp in a raised position, according to one or more embodiments.

The present innovation provides a height-adjustable shock pallet that supports a fully-integrated rack-mounted information handling system (IHS) during transport and does not require a ramp or unloading system at a customer site to offload the IHS rack from the pallet. The height-adjustable shock pallet replaces a conventional static shock pallet, a pallet jack, and a loading/unloading ramp in a single device. The shock pallet provides a damping system that can be tuned specifically to a weight of the rack-mounted IHS. A built-in capability to lower an upper deck of the shock pallet from a transport height of 7-8 inch to 1 inch reduces a required length of a ramp from 14 foot to 1 foot, eliminating a logistical burden.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is designated by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 2:
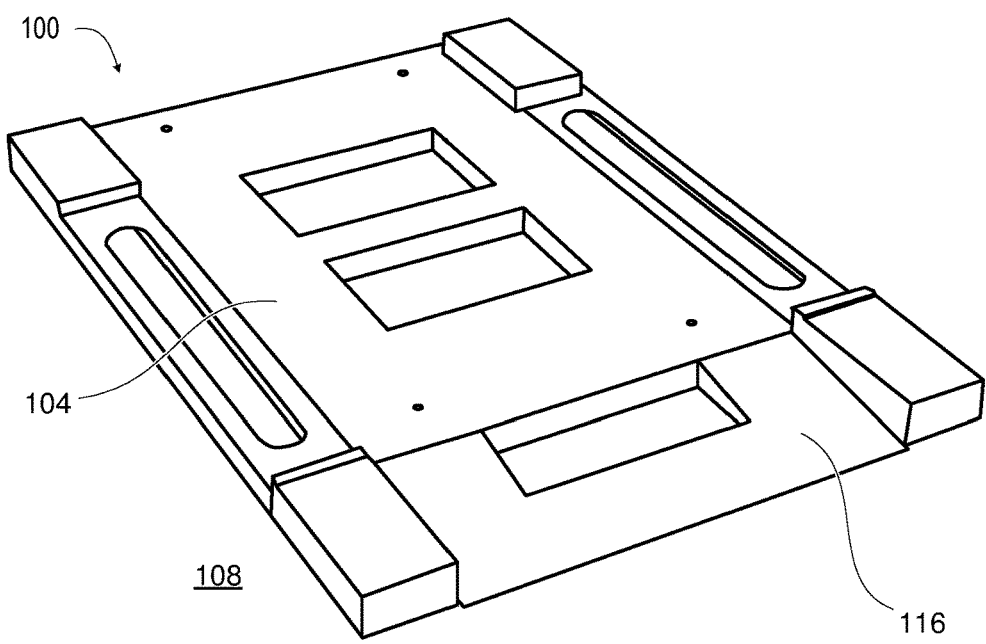
FIG. 2 illustrates a perspective view of the example height-adjustable shock pallet of FIG. 1 with integral ramp in a lowered position, according to one or more embodiments.

FIGS. 1-2 illustrates an example height-adjustable shock pallet 100 that expedites loading and off-loading of a rack-mounted IHS 102 (in phantom) and also provides an appropriate amount of damping and support during transport. FIG. 1 illustrates an upper deck 104 of the example height-adjustable shock pallet 100 in a raised position. Spaced-apart from upper deck 104 is a lower deck 106, which is supported by a floor surface 108, such as provided by a carrier transport, manufacturing facility, or customer destination. Upper deck 104 has a central portion 110 sized to receive rack-mounted IHS 102 for shipping. Rack-mounted IHS 102 can be shipped with servers installed into a rack frame and interconnected with communication and power cabling to form a fully integrated rack-mounted IHS 102. Servers can include switching, power, and cooling components. Rack-mounted IHS 102 has a weight profile of total weight, center of gravity (COG), weight distribution, height, footprint, etc., that dictates requirements for a height-adjustable shock pallet 100 for transport. In addition, requirements are dictated for loading and unloading rack-mounted IHS 102 without undue risk of tipping over. For purposes of this disclosure, an information handling system, such as rack-mounted IHS 102, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Out-rigger portions, depicted as downwardly open out-rigger cavities 109, are formed in upper deck 104 and have a higher vertical profile than, and surround, central portion 110. In one or more embodiments, four air bags 112 are attached between upper and lower decks 104, 106 within four corresponding out-rigger cavities 109 at rectangular corners. The air bags 112 are selectively inflatable to protect the rack-mounted IHS 102 during transport. Spacing between the air bags 112 provides laterally-aligned aperture/s 114 between the upper and lower decks 104, 106 for receiving tines of a forklift vehicle for lifting, moving, and/or positioning a palletized rack-mounted IHS (not shown). FIG. 2 further illustrates upper deck 104 of the example height-adjustable shock pallet 100 in a lowered position proximate to lower deck 106 (FIG. 1) for loading or unloading. An integral ramp 116 provides a transition between the upper deck 104 and the floor surface 108. The integral ramp 116 expedites loading and unloading by avoiding an additional step of attaching and detaching ramp 116.

For clarity, embodiments depicted and described herein include either four or six air bags. Four air bags are positioned respectively at a rectangular corner of a shock pallet. Additional lift can be provided by two bags at a midpoint of opposing lateral sides. Air bags are not depicted on opposing lateral sides that include a ramp in order to allow an upper deck to lower proximate to, or in contact with, the lower deck. However, embodiments of a height adjustable shock pallet could include one or more air bags along every lateral side or under the central portion of the upper deck. Embodiments can include more than six air bags.

Figure 3:
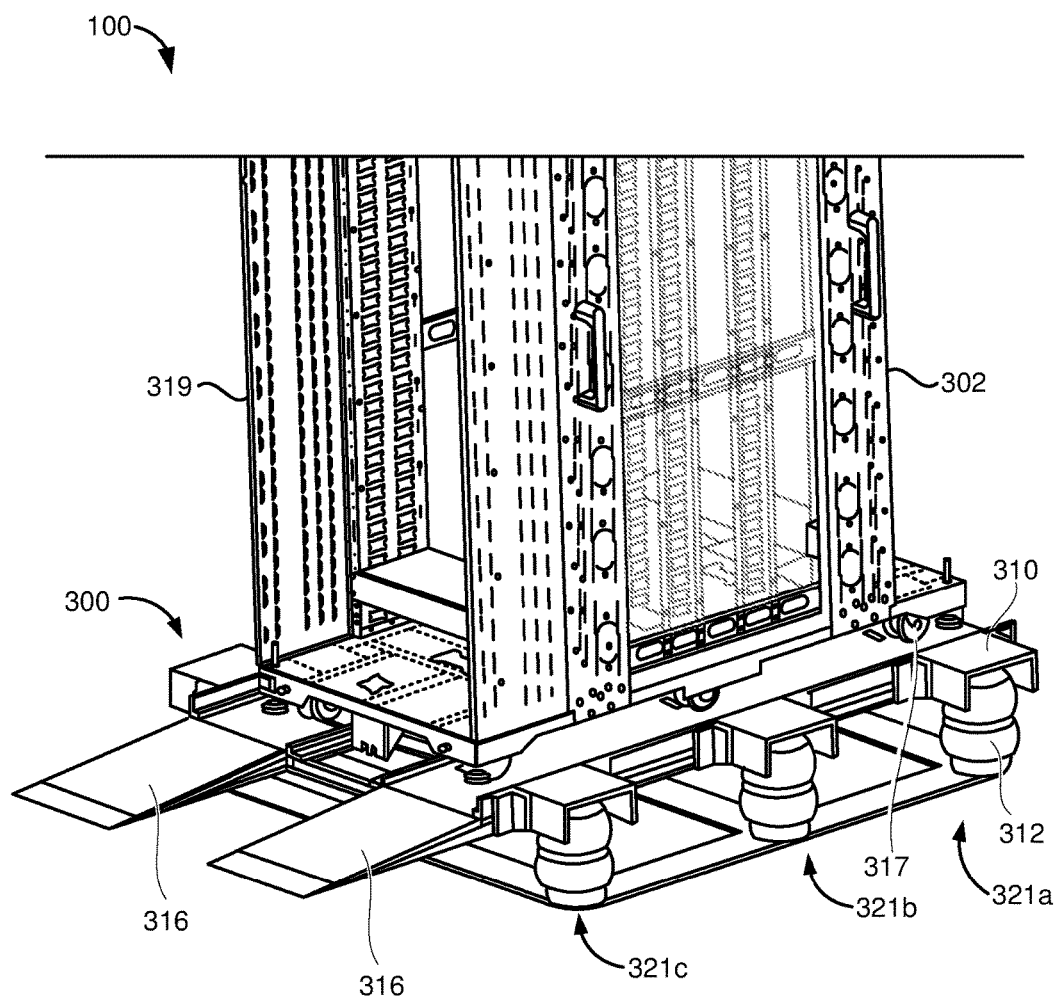
FIG. 3 illustrates a perspective view of an example height-adjustable shock pallet in a raised position supporting a rack-mounted information handling system (IHS), according to one or more embodiments.

FIGS. 3-8 illustrate an example height-adjustable shock pallet 300 having six air bags 312 received in six corresponding out-rigger cavities 310 and having two detachable ramps 316 (FIG. 7) in a raised position supporting a rack-mounted IHS 302. FIG. 3 illustrates rack casters 317 attached to a rack frame 319 of the rack-mounted IHS 302. Rack casters 317 enable loading and unloading off an upper deck 304 of the example height-adjustable shock pallet 300.

In one or more embodiments, all of air bags 312 can be pneumatically interconnected, allowing simultaneous inflation from a single source of compressed gas. Within these embodiments, in the event of a leak in one of air bags 312, all of air bags 312 simultaneously deflate, avoiding a tendency for tipping over of the rack-mounted IHS 302 (FIG. 3). Alternatively, a subset of air bags 312 can be pneumatically interconnected while being pneumatically isolated from one or more other subsets. For example, rack-mounted IHS 302 can have a COG that is closer to a front side than a back side. To maintain a more level orientation, a rear subset 321a of air bags 312 that can have a lower assigned pressure level than a middle subset 321b of air bags 312, which in turn have a lower assigned pressure level than a front subset 321c of air bags 312. Three respective pneumatic interconnects can each be simultaneously inflated to their respective assigned pressure levels. Simultaneous inflation can maintain rack-mounted IHS 302 in a level state to avoid tipping. Alternatively, each respective pneumatic interconnect can sequentially receive successive portions of the compressed gas required to reach an assigned pressure level. The incremental inflation can maintain the rack-mounted IHS 302 in a level state to avoid tipping.

Figure 4:
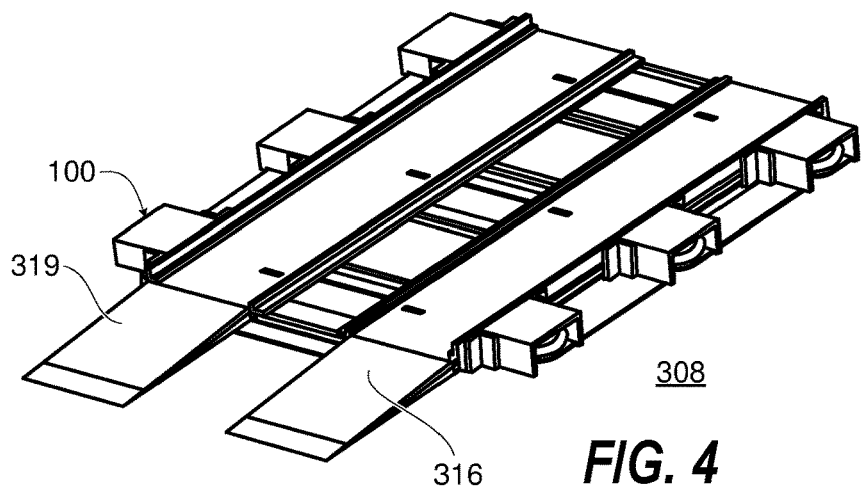
FIG. 4 illustrates a perspective view of the example height-adjustable shock pallet of FIG. 3 in a lowered position, according to one or more embodiments.
Figure 5:
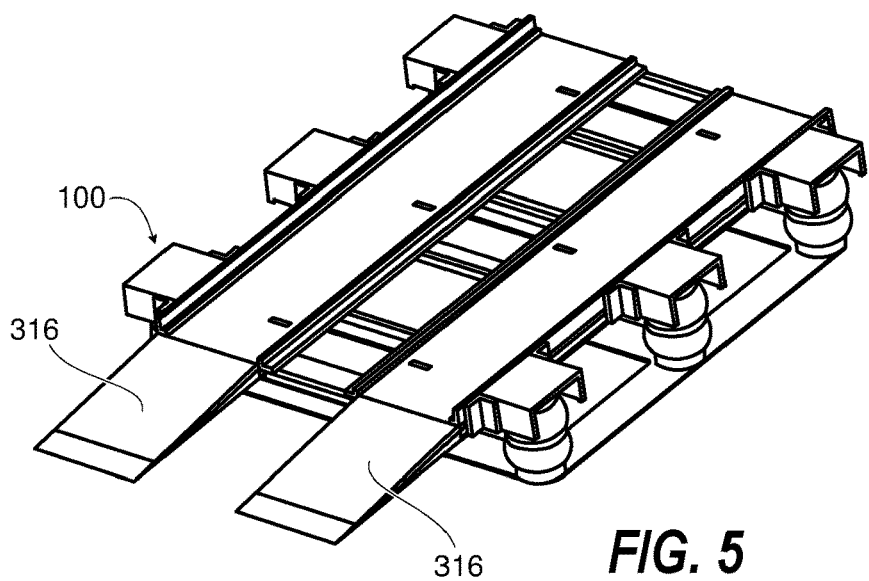
FIG. 5 illustrates another perspective view of the example height-adjustable shock pallet of FIG. 3 in a lowered position, according to one or more embodiments.
Figure 6:
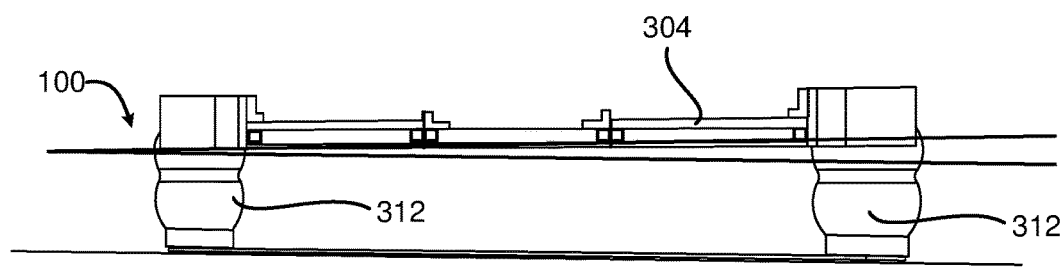
FIG. 6 illustrates a side view of the example height-adjustable shock pallet of FIG. 3 in a raised, rebalanced position, according to one or more embodiments.
Figure 7:
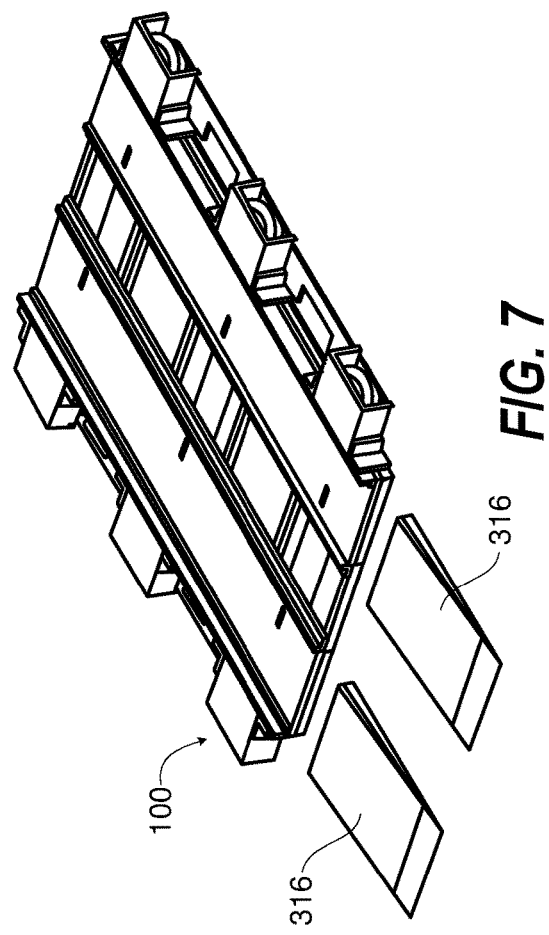
FIG. 7 illustrates a perspective view of the example height-adjustable shock pallet of FIG. 3 in a lowered position with detached ramps, according to one or more embodiments.
Figure 8:
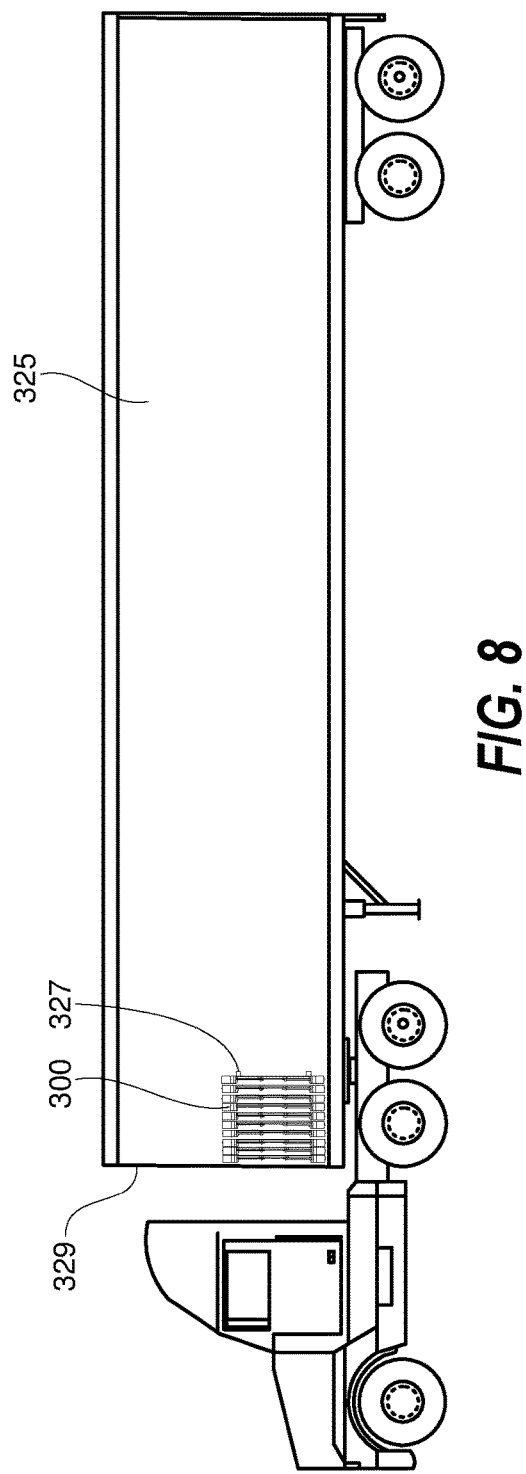
FIG. 8 illustrates a side view of a carrier truck trailer with stowed height-adjustable shock pallets, according to one or more embodiments.

FIG. 4 illustrates the example height-adjustable shock pallet 300 in a lowered position with the detachable ramps 316 in contact with a floor surface 308. FIG. 5 illustrates the example height-adjustable shock pallet 300 in a raised position. FIG. 6 illustrates the example height-adjustable shock pallet 300 having differential pressure between air bags 312 in order to rebalance the upper deck 304 to counter a tilt or inclination of the floor surface 308. In addition, air bags 312 can be of different types to meet the requirements of a particular use. For example, air bags 312 on one side that receive additional weight can have a larger design size. FIG. 7 illustrates detachable ramps 316 disengaged from the example height-adjustable shock pallet 300. The detachable ramps 316 can be stowed and shipped with the example height-adjustable shock pallet 300. In one implementation, a single pair of detachable ramps 316 can be used for more than one palletized rack-mounted IHS 302 (FIG. 3) that is loaded at an OEM facility or unloaded at a customer destination. FIG. 8 illustrates that the example height-adjustable shock pallet 300 can be packed in a small space in a truck trailer 325, such as being positioned between lateral logistic bars 327 and a front wall 329 of the truck trailer 325. Rather than being 7-8 inch high, the example height-adjustable shock pallet 300 are only 1 inch high when lowered prior to stowing. The exemplary embodiment uses steel for sufficient strength at a low height. Other embodiments can include materials such as aluminum or composite that can require an additional thickness of material for a required degree of strength.

In one or more embodiments, with reference to FIGS. 3-7, upper and lower decks 304, 306 and air bags 312 can be replaceable. In addition, upper and lower decks 304, 306 can be made of steel of sufficient strength to have an indefinite service life. Upper and lower decks 304, 306 are not required to provide a damping function and thus can have a rigid construction. In addition, air bags 312 can be replaced due to failure or to provide a greater weight capacity or change in height to accommodate different requirements. For example, in order to reduce inventory requirements, upper deck 304 can have sufficient strength to be used for a wide weight range. Height-adjustable shock pallets 300 can be assembled with a selected set of air bags 312 that have a dampening and support range that is more narrowly designed for a particular weight of rack-mounted IHS 302 (FIG. 3).

FIG. 9 illustrates an example height-adjustable shock pallet 900 that includes passive support devices 903 and passive damping devices 905 that can be locked into a support position between upper and lower decks 904, 906 in response to inflating air bags 912. FIG. 10 illustrates that the height-adjustable shock pallet 900 can be fully lowered by removal or disengagement of the passive support and damping devices 903, 905 (FIG. 9). In one or more embodiments, the passive support and damping devices 903, 905 can be manually inserted after air bags 912 raise upper deck 904. In one or more embodiments, passive support and damping devices 903, 905 can augment the support and damping characteristics of air bags 912. For example, passive support and damping devices 903, 905 can provide a minimum support requirement in the event of an air leak in one of air bags 912. Resilient pads 907 above and below each air bag 912 can also provide passive damping and support.

According to one or more aspects of the disclosure, use of air suspension provides damping and compliance in a structural shock pallet and also serves as a lifting feature to respectively raise and lower the pallet deck height for easier transport and depalletization. Passive spring/damping elements 903, 905 can be added for additional protection. For example, the passive spring/damping elements can provide a minimum level of damping for instances in which the air bags are deflated due to a leak, or loss of power. Alternatively, the passive spring/damping elements can be positioned to support an upper deck of the shock pallets after being raised by the air suspension. According to one embodiment, the air suspension can be all in pneumatic communication so that a leak results in a uniform settling of the shock pallet to avoid risk of tip over. Alternatively, an active system with separate inflatable subsets of air bags can detect a leak and cause deflation of the other air bags that are not leaking. Separate inflatable subsets can nominally be used to optimize damping characteristics for different weight distributions of rack-mounted IHSs and for different transportation vibration profiles. Further, having separate inflatable subsets of air bags can allow for leveling the rack-mounted IHS when a transport conveyance itself is inclined. The shock pallet can include rolling elements that contact an underlying surface when the air suspension is lowered, enabling maneuvering of the rack without a pallet jack. The air suspension can be manually inflated, can be inflated with use of an air pump, or can be connected to a source of compressed gas such as gas cylinder.

Figure 11:
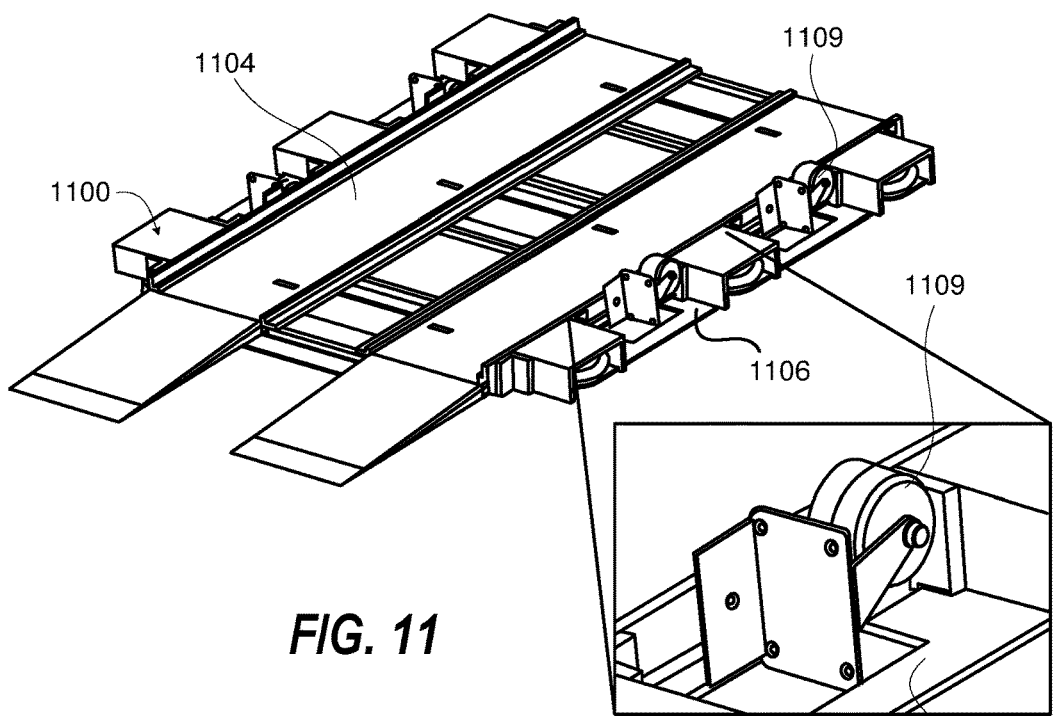
FIG. 11 illustrates a perspective view of an example height-adjustable shock pallet in a lowered position and having positionable casters in a stowed position, according to one or more embodiments.
Figure 12:
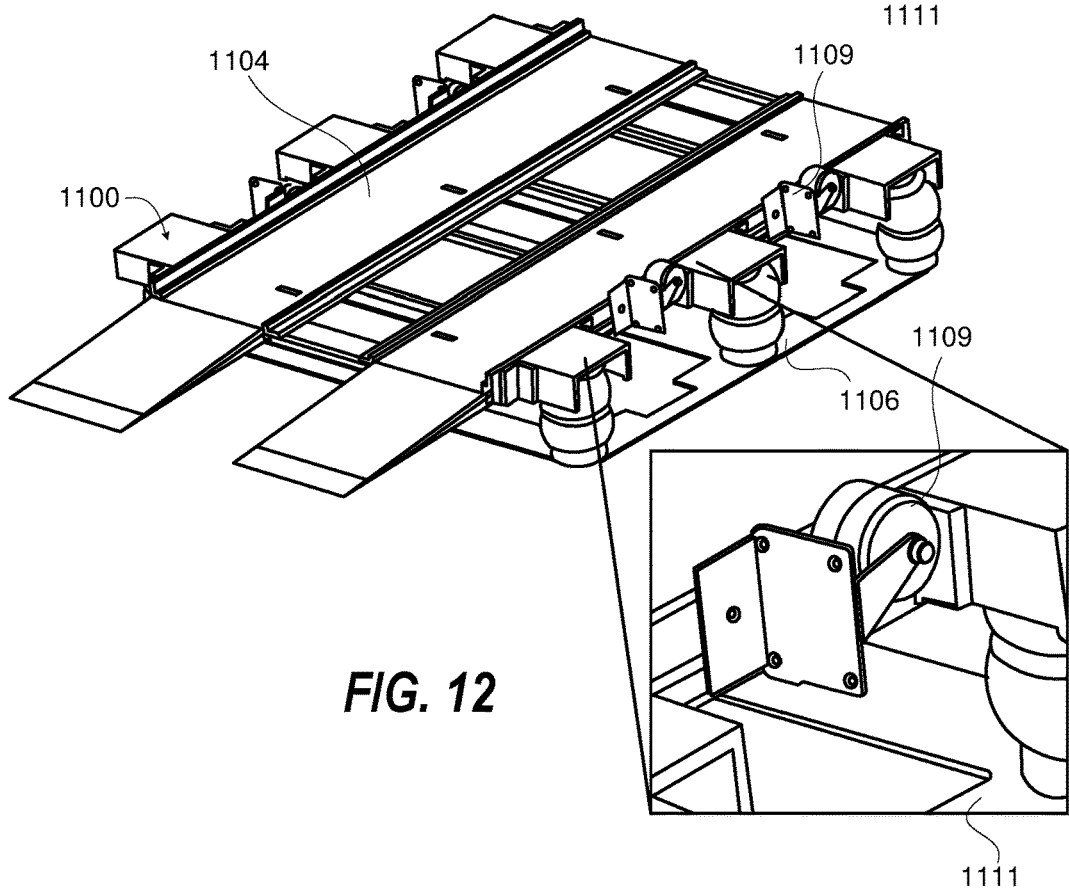
FIG. 12 illustrates a perspective view of the example height-adjustable shock pallet in a raised position and having positionable casters in the stowed position, according to one or more embodiments.
Figure 13:
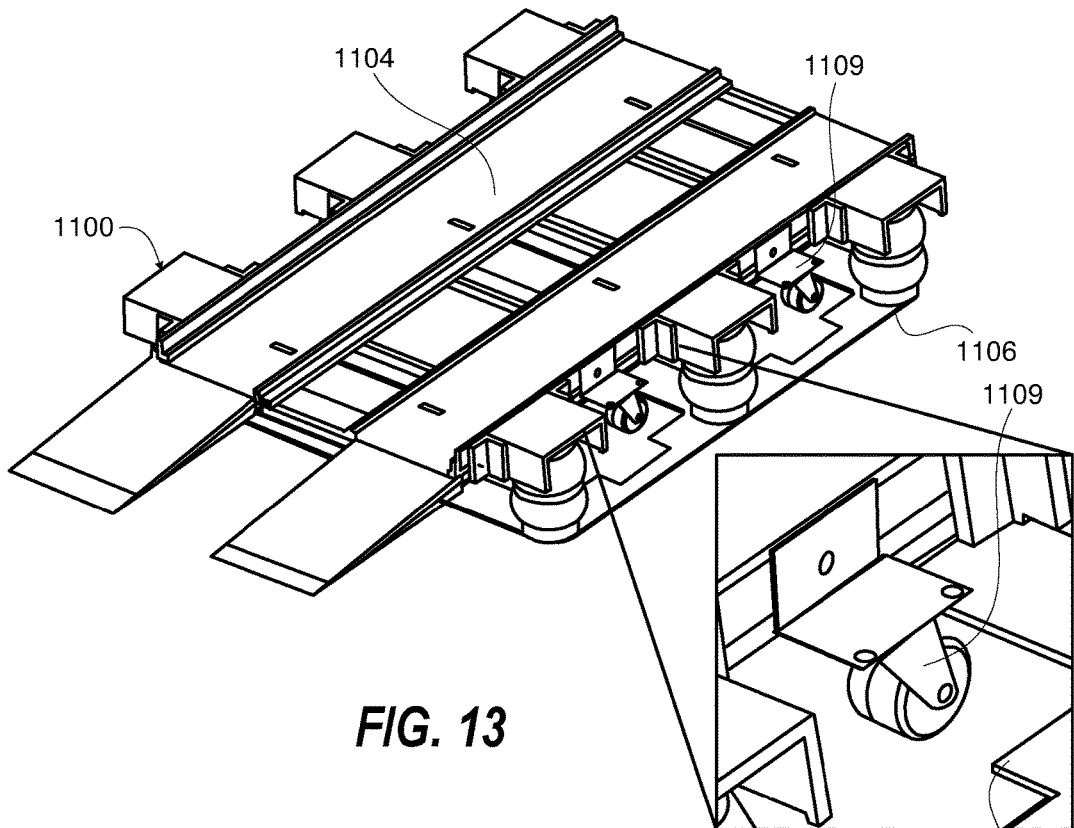
FIG. 13 illustrates a perspective view of the example height-adjustable shock pallet in a raised position and having positionable casters in an extended position, according to one or more embodiments.
Figure 14:
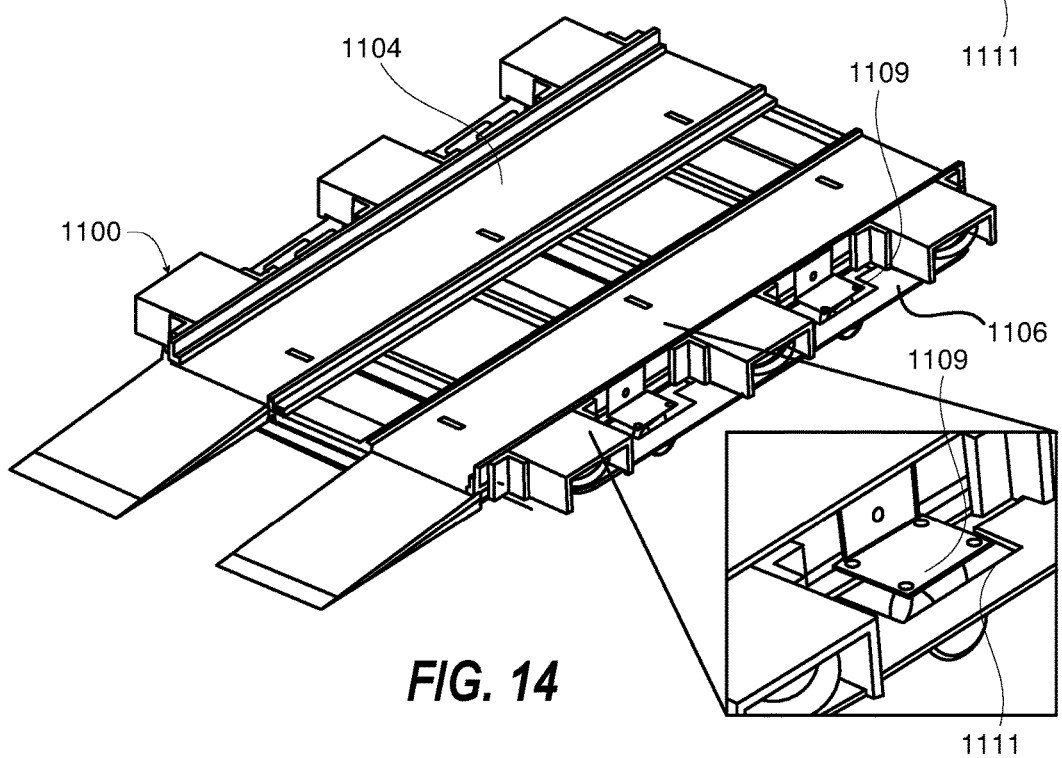
FIG. 14 illustrates a perspective view of the example height-adjustable shock pallet in a lowered position supported on the positionable casters in the extended position, according to one or more embodiments.

FIGS. 11-14 illustrate an example height-adjustable shock pallet 1100 having caster wheels 1109 rotatably mounted to an upper deck 1104. Apertures 1111 in a lower deck 1106 below each of caster wheels 1109 allow each caster wheel 1109 to extend through lower deck 1106 and contact a floor surface 1116 while upper deck 1104 is in the lowered position. FIG. 11 illustrates the caster wheels 1109 rotated to a stowed position, enabling upper deck 1104 to be fully lowered for loading the example height-adjustable shock pallet 1100. FIG. 12 illustrates an example height-adjustable shock pallet 1100 raised for transport with the caster wheels 1109 remaining stowed to allow full damping motion by air bags 1112. FIG. 13 illustrates the caster wheels 1109 rotated downward to their extended positions. FIG. 14 illustrates example height-adjustable shock pallet 1100 lowered with the caster wheels 1109 in contact with the floor surface 1116 for rolling example height-adjustable shock pallet 1100 along the floor surface. When casters 1109 are rotated down, lower deck 1106 can be raised to upper deck 1104 by air bags 1112 are fully deflated. Lifting force can be accomplished or assisted by compliant elements 903 (FIG. 9). Upper and lower decks 1104, 1106 may be locked together.

Figure 15:
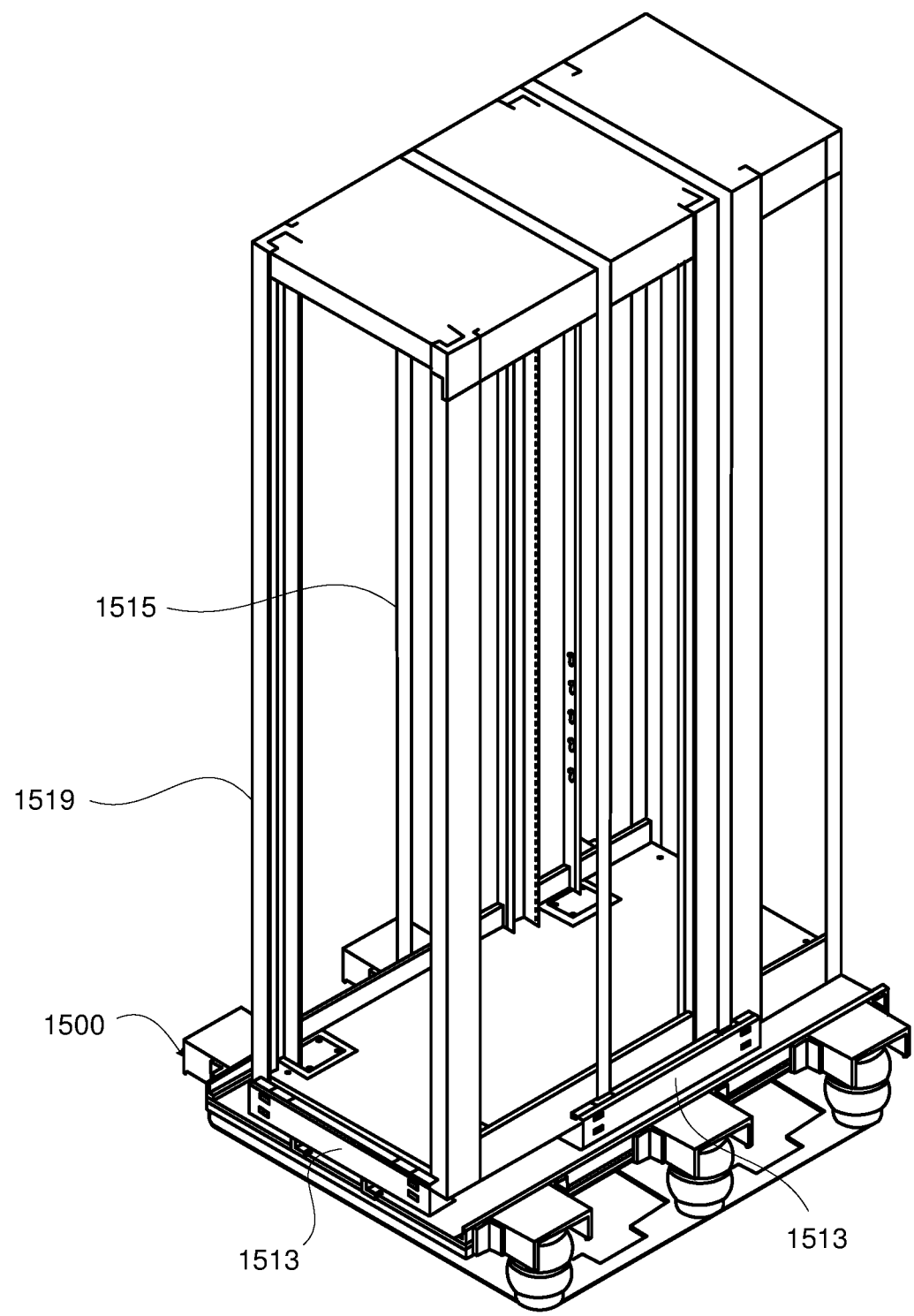
FIG. 15 illustrates a perspective view of an example height-adjustable shock pallet in a raised position with retention brackets on four sides of an equipment rack held by vertical straps, according to one or more embodiments.
Figure 16:
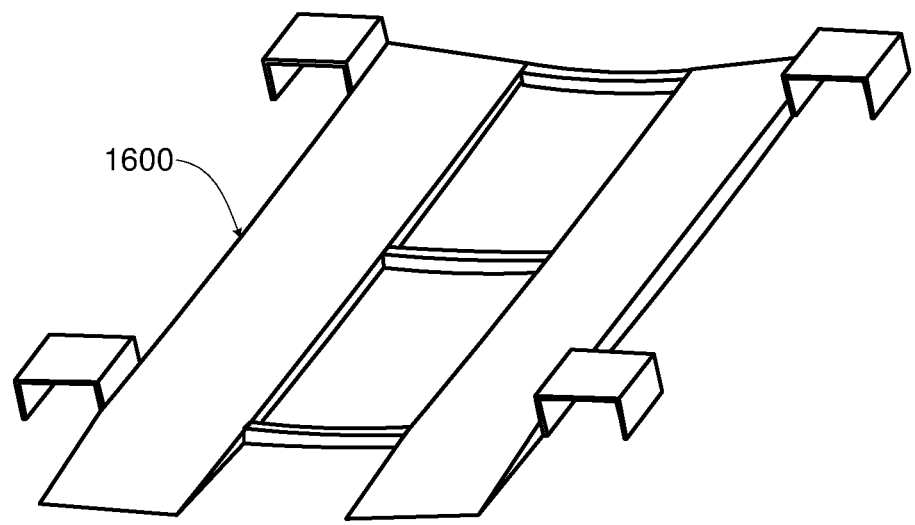
FIG. 16 illustrates a graphical depiction of a load analysis performed for an example height-adjustable shock pallet having four out-rigger supports for four air bags and three crossbars, according to one or more embodiments.

FIG. 15 illustrates an example height-adjustable shock pallet 1500 with adjustable brackets 1513 that slide in and out to accommodate a variety of rack sizes. Vertical straps 1515 attached to adjustable brackets 1513 on opposite sides of a rack frame 1519 can accommodate different heights of rack-mounted IHSs.

FIGS. 16-19 illustrate a series of height-adjustable shock pallets 1600, 1700, 1800, 1900 that were designed to accommodate increasing loads. Load analyses performed to identify areas of maximum stress as a design was refined to achieve a shock pallet that can hold 4800 lbs or more. FIG.

Figure 17:
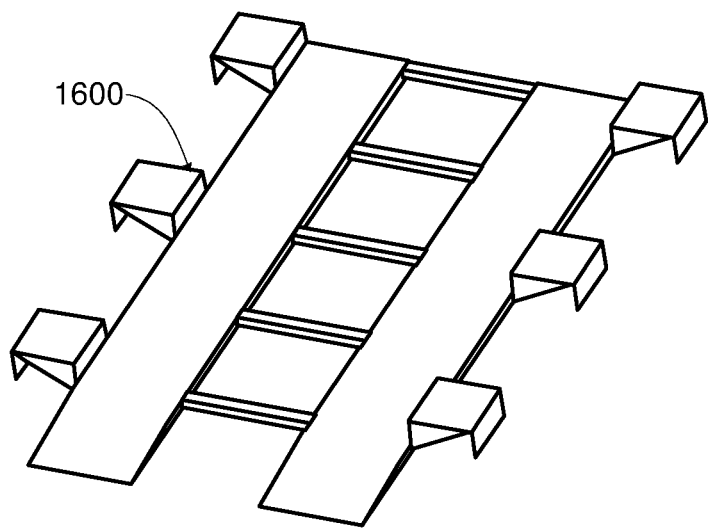
FIG. 17 illustrates a graphical depiction of a load analysis performed for an example height-adjustable shock pallet having six out-rigger supports for six air bags and five crossbars, according to one or more embodiments.
Figure 18:
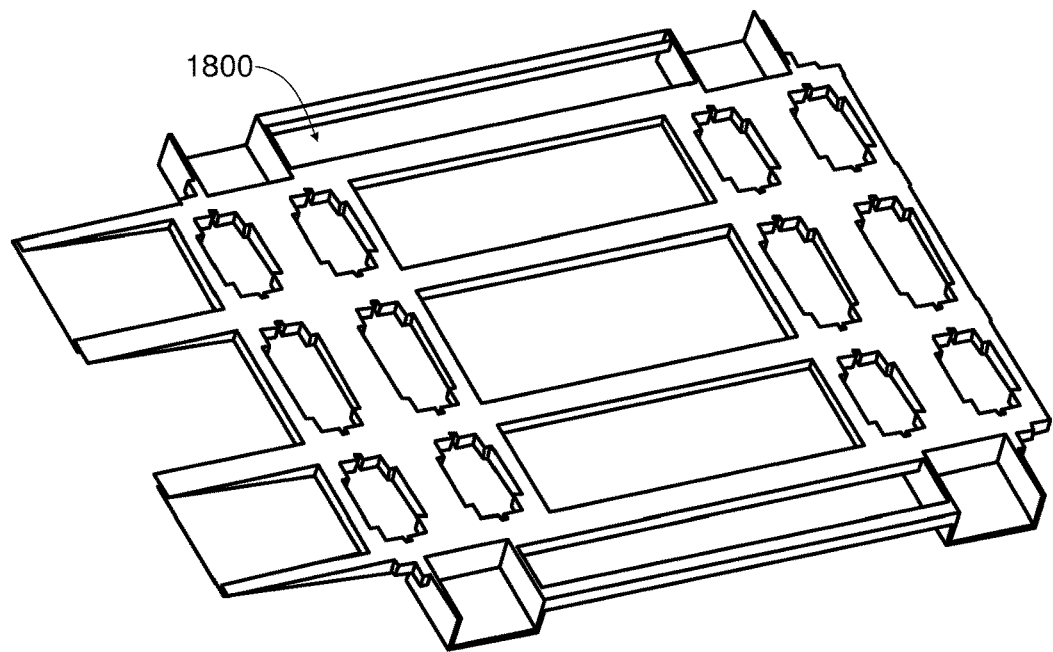
FIG. 18 illustrates a graphical depiction of a load analysis performed for an example height-adjustable shock pallet having four out-rigger supports for four air bags and two multi-crossbars, according to one or more embodiments.
Figure 19:
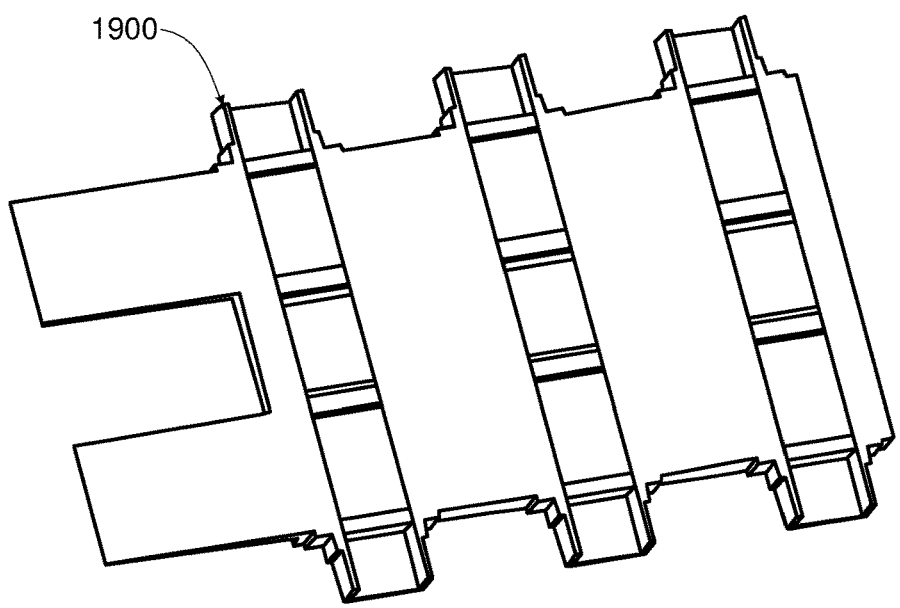
FIG. 19 illustrates a graphical depiction of a load analysis performed for an example height-adjustable shock pallet having six out-rigger supports for six air bags and three multi-crossbars, according to one or more embodiments.

16 illustrates an example height-adjustable shock pallet 1600 having four outrigger supports for four air bags and three crossbars. FIG. 17 illustrates an example height-adjustable shock pallet 1700 having six outrigger supports for six air bags and five crossbars. FIG. 18 illustrates an example height-adjustable shock pallet 1800 having four outrigger supports for four air bags and two multi-crossbars. FIG. 19 illustrates an example height-adjustable shock pallet 1900 having six outrigger supports for six air bags and three multi-crossbars. The load analyses indicate that maximum stresses were reduced with each successive design.

Figure 20:
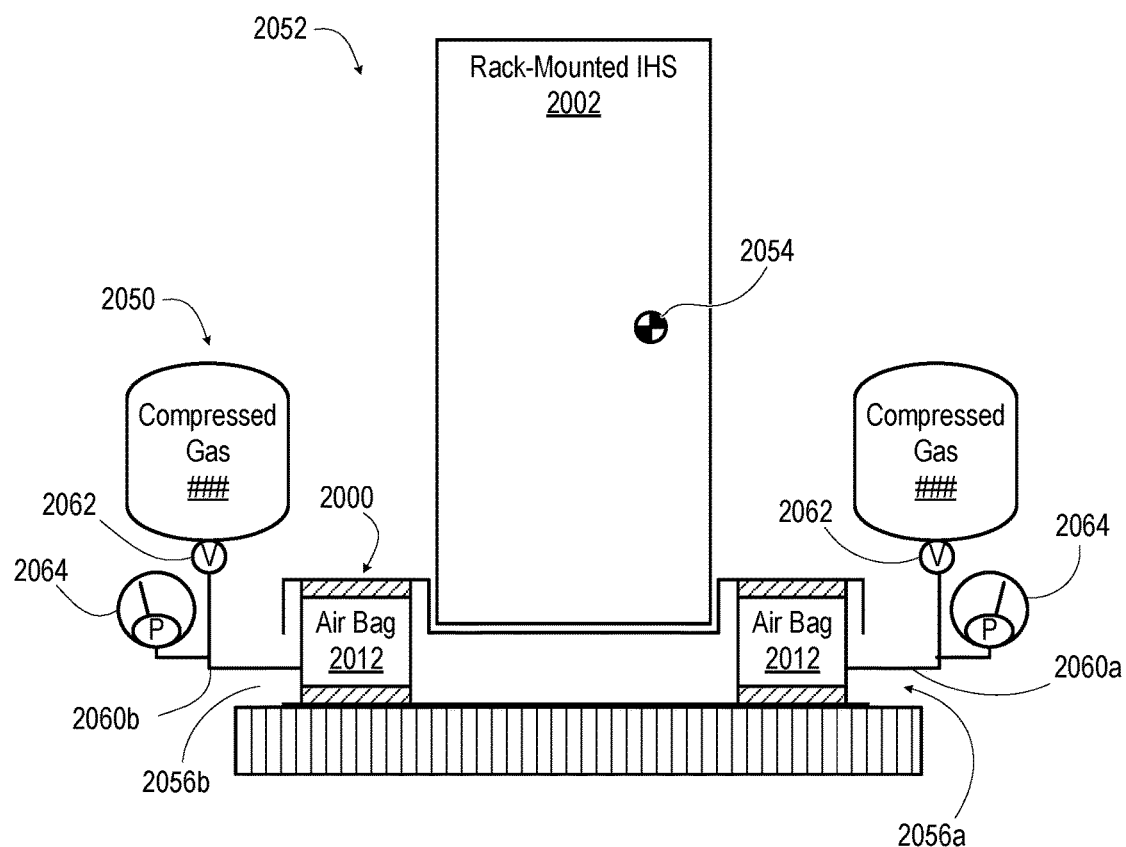
FIG. 20 illustrates a diagram of an example height-adjustable shock pallet in a raised position with a manual or passive inflation system, according to one or more embodiments.
Figure 21A:
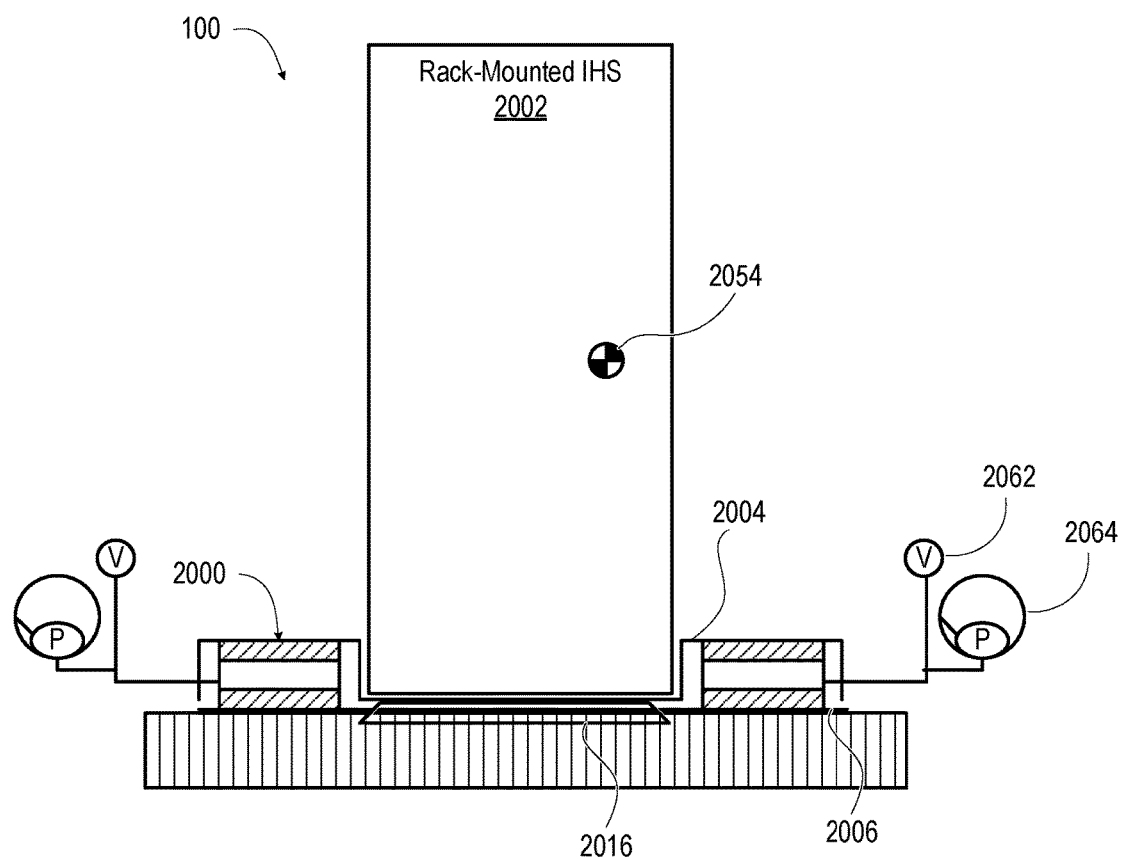
FIG. 21A illustrates a diagram of the example height-adjustable shock pallet of FIG. 20 in a lowered position, according to one or more embodiments.
Figure 21B:
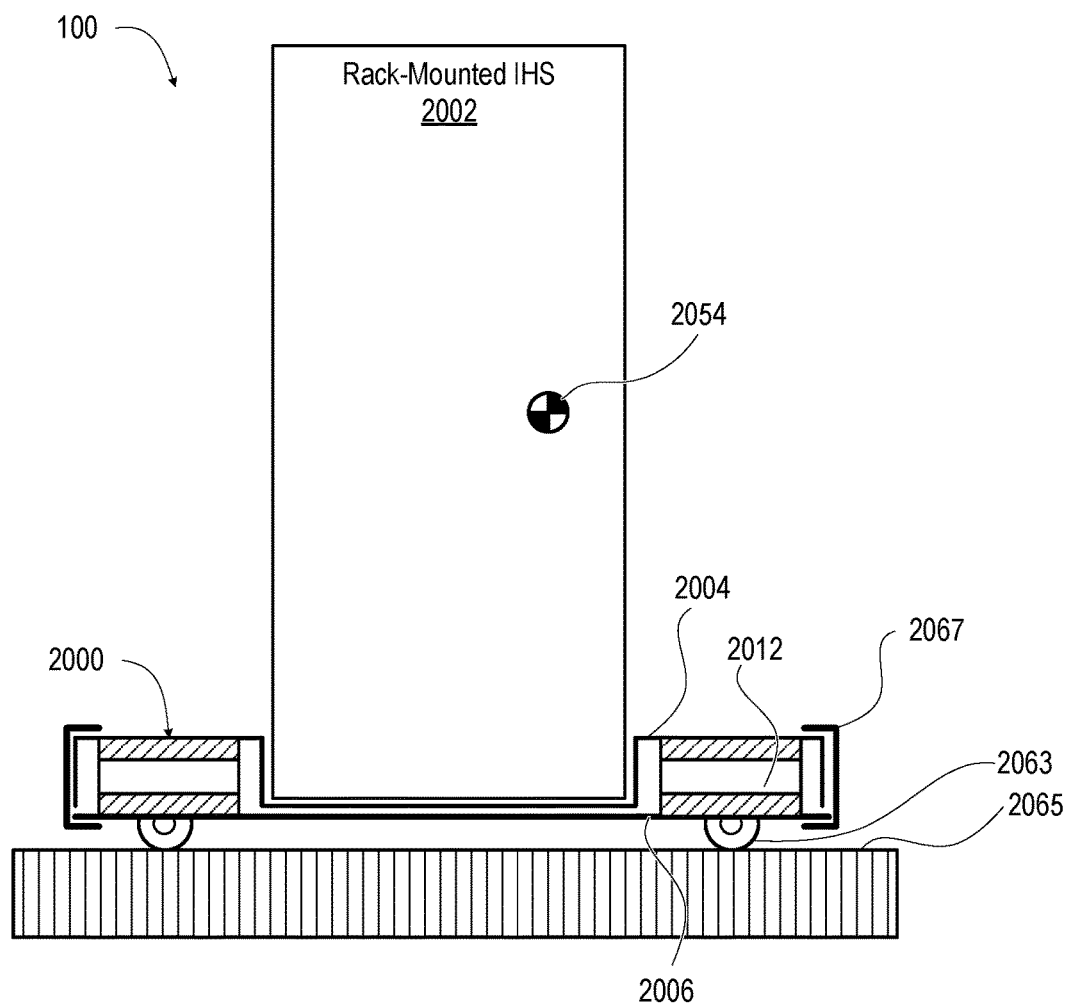
FIG. 21B illustrates a diagram of the example height-adjustable shock pallet of FIG. 20 on casters, according to one or more embodiments.

FIG. 20 illustrates an example height-adjustable shock pallet 2000 in a raised position with a manual or passive inflation system 2050 as part of transport system 2052. An upper deck 2004 is raised above a lower deck 2006 by air bags 2012. A rack-mounted IHS 2002 has an off-center COG 2054 that is compensated for by inflating a first subset 2056a of air bags 2012 to a higher-pressure level than a second subset 2056b of air bags 2012. A portable source of compressed air such as gas cylinder 2058 can inflate each subset 2056a-2056b in stages or multiple portable sources of compressed gas 2058 can simultaneously inflate all subsets 2056a-2056b. Portable source of compressed air 2058 can include a refillable compressed gas cylinder 2059 and an air compressor 2061. In one or more embodiments, pneumatic interconnects 2060a-2060b can be closed by valves 2062 with pressure gauges or pressure sensors 2064 provided for monitoring an operating status of air bags 2012. FIG. 21A illustrates air bags 2012 in a deflated state with a ramp 2016 installed. FIG. 21B illustrates casters 2063 that are positionable downward from, upper deck 2004 and then lowered into contact with a floor surface 2065. Then lower deck 2006 is held in close proximity to the upper deck 2004 by one or more devices, such as deflated air bags 2012, and a locking mechanism 2067, such as a clamp, latch, bungee cord, resilient door anchor straps, etc.

Figure 22:
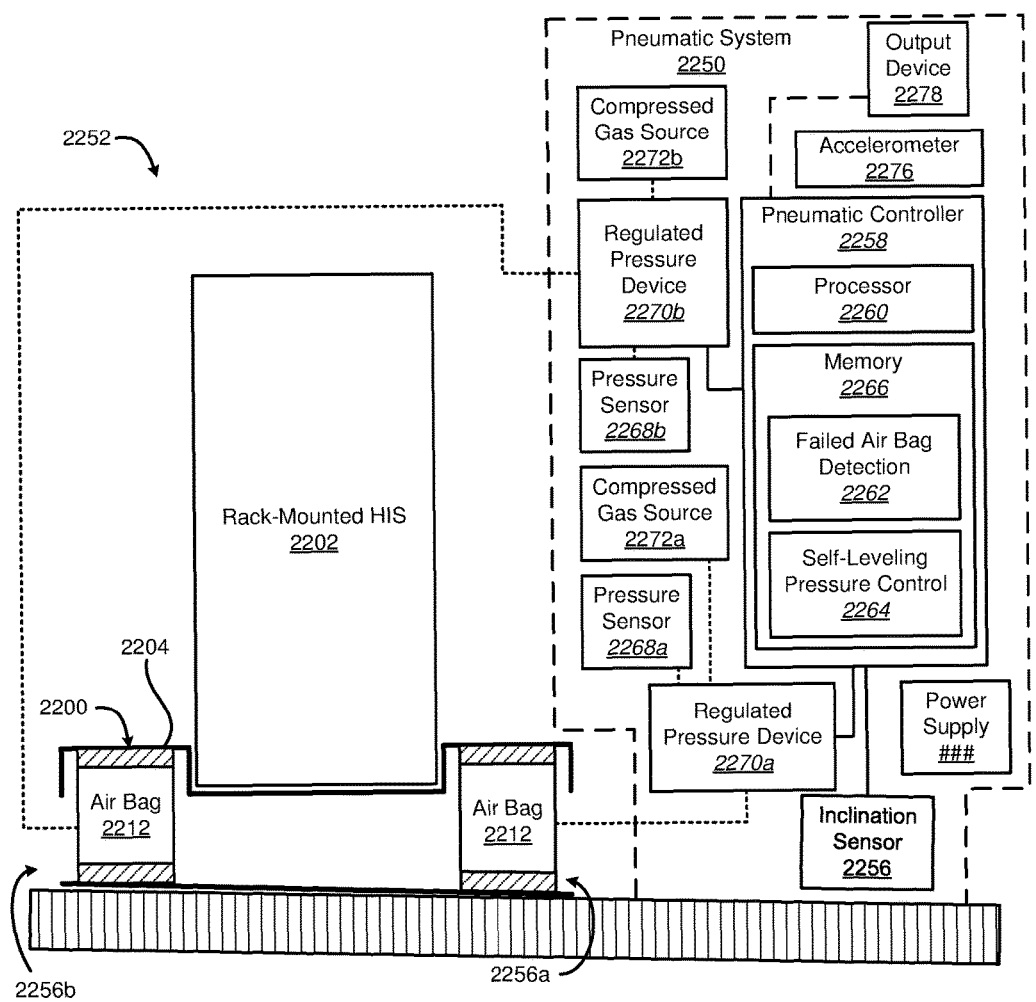
FIG. 22 illustrates a side view of an example height-adjustable shock pallet in a raised and rebalanced position by an active rebalancing system, according to one or more embodiments.

FIG. 22 illustrates an example height-adjustable shock pallet 2200 in a raised and rebalanced position by an active rebalancing pneumatic system 2250 as part of a transport system 2252. Rebalancing can be required due to an off-center COG of a rack-mounted IHS 2202 compressing air bags 2212 on one side of example height-adjustable shock pallet 2200 more than another. Rebalancing can also be triggered in response to a tilt sensor 2254 attached to an upper deck 2204. Additionally, a tilt sensor 2255 can detect an incline in a floor surface 2216.

A pneumatic controller 2258 of pneumatic system 2250 can include a processor 2260 that executes a failed air bag detection utility 2262 and a self-leveling pressure control utility 2264 contained in a memory 2266. Each subset 2256a-2256b of air bags 2212 can be monitored by respective pressure sensors 2268a-2268b and be inflated or deflated by respective electrically actuated regulated pressure devices 2270a-2270b that control compressed gas sources 2272a-2272b. Pneumatic system 2250 can include an autonomous power supply 2274. An accelerometer 2276 can be used to detect vibration during transport. The pneumatic controller 2258 can characterize a vibration profile, such as vibration induced by rolling ocean waves, rough roads, frequent starts and stops on surface streets, etc. A status of transport system 2252 can be communicated to an output device 2278. For example, a driver can receive an alert when a failure has occurred. The alert can indicate that repair is required before continuing to transport a particular rack-mounted IHS 2202. The alert can indicate that an amount of protection against vibration or tilting has been reduced, which can require slowing down the travelling velocity of the transport. For example, an amount of inflation of the air bags can be degraded but not wholly failed. As another example, the air bags can be completely deflated, where passive damping elements provide a minimum amount of protection. In addition, output device 2278 can report when accelerations are approaching limits of the transport system 2252. The report can include measurements of the current measurement as well as the limit in graphical and numeric forms. The support and damping characteristics of the air bags 2212 can be adjusted to correspond to an optimum response to the vibration profile. For clarity, only one example height-adjustable shock pallet 2200 is depicted as being served by pneumatic system 2250. However, transport system 2252 can include more than one example height-adjustable shock pallet 2200 serviced by the same/single pneumatic system 2250.

Figure 23:
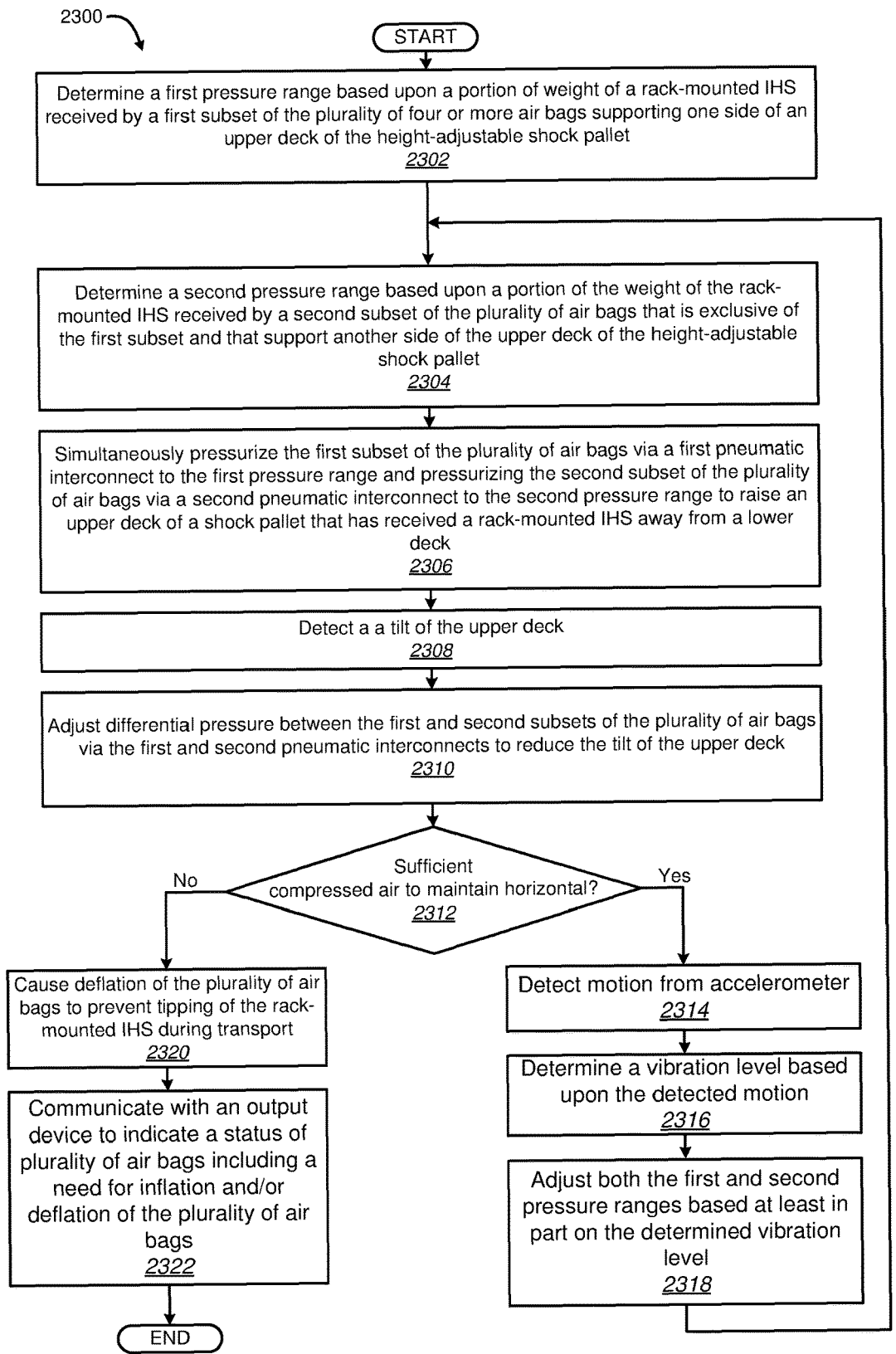
FIG. 23 illustrates a flow diagram of a method of adjusting a height-adjustable shock pallet utilized to expedite shipping and depalletizing of rack-mounted IHSs, according to one or more embodiments.

FIG. 23 illustrate a flowchart of an exemplary method 2300 by which an automated pneumatic controller 2258 (FIG. 22) performs different aspects of the processes that enable the one or more embodiments of the disclosure. Specifically, FIG. 23 illustrates a method 2300 of height adjusting a height-adjustable shock pallet utilized to expedite shipping and depalletizing of rack-mounted IHSs. Generally, method 2300 represent a computer-implemented method. The description of method 2300 is provided with general reference to the specific components illustrated within FIG. 22. Generally, method 2300 is described as being implemented via processor 2260 (FIG. 22). It is however appreciated that certain aspects of the described methods may be implemented via other processing devices and/or execution of other code.

In one or more embodiments, method 2300 includes determining a first pressure range based on a portion of weight of a rack-mounted IHS received by a first subset of a plurality of air bags supporting one side of an upper deck of the height-adjustable shock pallet (block 2302). Method 2300 includes determining a second pressure range based on a portion of the weight of the rack-mounted IHS received by a second subset of the plurality of air bags that support another side of the upper deck of the height-adjustable shock pallet (block 2304). The second subset of airbags is exclusive of the first subset. Following installation and securing of a rack-mounted IHS to the upper deck, method 2300 includes simultaneously pressurizing the first subset of the plurality of air bags via a first pneumatic interconnect to the first pressure range and pressurizing the second subset of the plurality of air bags via a second pneumatic interconnect to the second pressure range to raise an upper deck of a shock pallet away from a lower deck (block 2306). Method 2300 includes detecting a tilt of the upper deck (block 2308). Method 2300 includes adjusting differential pressure between the first and second subsets of the plurality of air bags via the first and second pneumatic interconnects to reduce the tilt of the upper deck (block 2310). Mitigating the tilt can entail reducing or substantially eliminating any deviation of the rack from a fully horizontal position. Mitigating the tilt can also mean compensating for acceleration. Method 2300 includes determining whether a portable source is able to provide sufficient compressed air to maintain the upper deck in a substantially horizontal position (decision block 2312). In response to determining in decision block 2312 that portable source is able to provide sufficient compressed air to maintain the upper deck in a substantially horizontal position, method 2300 includes detecting motion from an accelerometer (block 2314). Method 2300 includes determining a vibration level based upon the detected motion (block 2316). Method 2300 includes adjusting both the first and second pressure ranges based at least in part on the determined vibration level (block 2318). Then method 2300 returns to block 2304.

In response to determining whether a portable source is unable to provide sufficient compressed air to maintain the upper deck in a substantially horizontal position in decision block 2312, method 2300 includes triggering a deflation of the plurality of air bags to prevent tipping of the rack-mounted IHS during transport (block 2320). Method 2300 includes communicating with an output device to indicate a status of the plurality of air bags, including a need for inflation and/or deflation of the plurality of air bags (block 2322). Then method 2300 ends.

In the above-described flow chart of FIG. 2300, one or more of the methods may be embodied in an automated control system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is designated only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A height-adjustable shock pallet comprising:
   a lower deck;
   an upper deck having a central portion sized to receive a rack-mounted information handling system (IHS) for shipping and which is selectively positionable: (i) in a lowered position that is proximate to the lower deck and a supporting surface for loading and unloading, and (ii) in a raised position, spaced apart from the lower deck;
   a plurality of air bags attached between the lower and upper decks and which are selectively inflatable to protect the rack-mounted IHS during transport and deflatable to position the upper deck between the raised position and the lowered position;
   a sensor positioned to detect tilt of the upper deck; and
   a controller in communication with a portable source of compressed air and the sensor, and which:
      determines a direction of a detected tilt of the upper desk tilts; and
      controls flow of compressed air in the plurality of air bags to rebalance the upper deck to a substantially horizontal position.

2. The height-adjustable shock pallet of claim 1, wherein the upper deck comprises out-rigger portions attached to and outwardly projecting from the central portion, the out-rigger portions having a higher vertical profile than the central portion to receive respective ones of the plurality of air bags enabling the central portion to lower proximate to the lower deck.

3. The height-adjustable shock pallet of claim 1, wherein the plurality of air bags are positioned such that a configuration of the upper deck, spaced apart from the lower deck in the raised position, provides laterally aligned apertures to receive forklift tines.

4. The height-adjustable shock pallet of claim 1, further comprising a plurality of caster wheels mounted to the upper deck, wherein the lower deck comprises at least one aperture below each of the plurality of caster wheels to allow each caster wheel to extend through a respective aperture and contact the floor while the upper deck is in the lowered position.

5. The height-adjustable shock pallet of claim 4, wherein the plurality of caster wheels are rotatably mounted to the upper deck and positionable between a horizontal and vertical position, the horizontal position enabling the upper deck to be lowered to a lower position without the wheels extending to the supporting surface to facilitate loading and unloading of the equipment rack.

6. The height-adjustable shock pallet of claim 5, wherein the lower deck is held up against the upper deck by at least one of: (i) deflated air bags; (ii) a locking mechanism; and (iii) a compliant member attached between the upper and lower decks.

7. The height-adjustable shock pallet of claim 1, wherein the upper deck comprises a ramped portion that contacts the supporting surface when the upper deck is in the lowered position, wherein the ramped portion is a selected one of attached to and attachable to the upper deck.

8. The height-adjustable shock pallet of claim 1, further comprising:
a first pneumatic interconnect to receive compressed air at a first pressure level into a first subset of the plurality of air bags; and
a second pneumatic interconnect to receive compressed air at a second pressure level to a second subset of the plurality of air bags that is exclusive of the first subset;
wherein the first and second pressure levels are selected based on a weight of the rack-mounted IHS on the respective one of the first and second subsets.

9. The height-adjustable shock pallet of claim 1, further comprising:
a first pneumatic interconnect to receive compressed air at a first pressure level into a first subset of the plurality of air bags; and
a second pneumatic interconnect to receive compressed air at a second pressure level to a second subset of the plurality of air bags that is exclusive of the first subset;
wherein the controller:
determines first and second pneumatic pressure ranges assigned to the first and the second subset based at least in part on: (i) a lower threshold set for a required dampening of vibration during transport; and (ii) an upper threshold set by a constraining upper design pressure limit of a combination of the portable source, the first and second pneumatic interconnects, and the plurality of air bags; and
in response to determining the direction of the tilt, controls the portable source to rebalance the upper deck to a substantially horizontal position by adjusting a pneumatic pressure differential between the first and second subsets by one or more inflating and deflating while maintaining each of the first and second subsets within the respective first and second pneumatic pressure ranges.

10. The height-adjustable shock pallet of claim 1, wherein the portable source of compressed gas comprises a selected one of an air pump and a pressurized gas cylinder.

11. The height-adjustable shock pallet of claim 1, wherein the controller:
determines whether the portable source is able to provide sufficient compressed air to maintain the upper deck in a substantially horizontal position; and
in response to determining that the portable source is unable to provide sufficient compressed air to maintain the upper deck in a substantially horizontal position, causes the deflation of the plurality of air bags to prevent tipping of the rack-mounted IHS during transport.

12. The height-adjustable shock pallet of claim 11, further comprising an output device, wherein the controller communicates with the output device to indicate a status of the plurality of air bags including a need for one of inflation or deflation of the plurality of air bags.

13. The height-adjustable shock pallet of claim 1, further comprising:
a pneumatic interconnect in fluid communication with the plurality of air bags;
at least one pressure sensor in communication with the plurality of air bags to detect a pressure value in each of the plurality of air bags; and
a memory containing a data structure containing an assigned pressure value associated with a weight of the rack-mounted IHS;
wherein the controller is in communication with the pressure sensor and the memory, and the controller:
determines a weight setting of the rack-mounted IHS; and
determines, based on the detected pressure value, whether at least one of the plurality of air bags is below the assigned pressure value associated with the weight setting; and
in response to determining that the detected pressure value is below the assigned pressure value, directs compressed air from a portable source to the pneumatic interconnect to maintain the plurality of air bags at the assigned pressure value.

14. The height-adjustable shock pallet of claim 13, wherein:
the data structure contains a first assigned pressure value for a first subset of air bags and contains a second assigned pressure value that is not equal to the first assigned pressure value for a second subset of air bags corresponding to an off-center center gravity of the rack-mounted IHS; and
the controller directs the compressed air to maintain each of the first and second subset of air bags at the respective first and second assigned pressure values.

15. The height-adjustable shock pallet of claim 1, further comprising:
an accelerometer to detect motion of the upper deck; and
wherein the controller is in communication with the accelerometer, and the controller:
receives detected motion from the accelerometer;
determines a vibration level based upon the detected motion; and
adjusts the assigned pressure value of one or more of the plurality of air bags based at least in part on the determined vibration level.

16. The height-adjustable shock pallet of claim 1, further comprising a shock absorbing layer attached to one of an undersurface of the upper deck and an upper surface of the lower deck to provide vibration protection to the rack-mounted IHS subsequent to deflation of the plurality of air bags.

17. An information handling system (IHS) comprising:
a device interface in communication with an electrically-actuated source of compressed gas that selectively pressurizes a first pneumatic interconnect to a first subset of air bags and a second pneumatic interconnect to a second subset of air bags that is exclusive of the first subset to raise an upper deck of a shock pallet that has received a rack-mounted IHS away from a lower deck;
a tilt sensor attached to an upper deck of the shock pallet and which detects a tilt of the upper deck; and
a controller in communication with the tilt sensor and the electrically-actuated source via the device interface, wherein the controller:
simultaneously pressurizes a first pneumatic interconnect to the first subset of air bags and a second pneumatic interconnect to the second subset of air bags that is exclusive of the first subset to raise an upper deck of a shock pallet that has received a rack-mounted IHS away from a lower deck; and differentially adjusts pressure between the first and second subsets of the plurality of air bags via the first and second pneumatic interconnects respectively to mitigate the tilt of the upper deck.

18. The IHS of claim 17, wherein the controller:

determines a first pressure range based upon a portion of the weight of the rack-mounted IHS received by the first subset of the plurality of air bags;

determines a second pressure range based upon a portion of the weight of the rack-mounted IHS received by the second subset of the plurality of air bags;

simultaneously pressurizes the first subset of the plurality of air bags via the first pneumatic interconnect to the first pressure range and pressurizes the second subset of the plurality of air bags via second pneumatic interconnect to the second pressure range.

19. The IHS of claim 17, further comprising an output device, wherein the controller:

determines whether the portable source is able to provide sufficient compressed air to maintain the upper deck in a substantially horizontal position; and in response to determining that the portable source is unable to provide sufficient compressed air to maintain the upper deck in a substantially horizontal position: (i) causes the deflation of the plurality of air bags to prevent tipping of the rack-mounted IHS during transport and (ii) communicates with the output device to indicate a status of plurality of air bags including a need for inflation and/or deflation of the plurality of air bags.

20. A method comprising:

simultaneously pressurizing a first pneumatic interconnect to a first subset of four or more air bags and a second pneumatic interconnect to a second subset of the four or more air bags that is exclusive of the first subset to raise an upper deck of a shock pallet that has received a rack-mounted information handling system (IHS) away from a lower deck;

detecting, by a sensor a tilt of the upper deck; and automatically adjusting, by a controller, differential pressure between the first and second pneumatic interconnects to mitigate the tilt of the upper deck.

* * * * *